C. E. FULK & J. J. GOOD.
Fenders for Railway Carriage-Wheels.
No. 154,327.　　　　　　　　　　　Patented Aug. 25, 1874.
— FIG. I. —
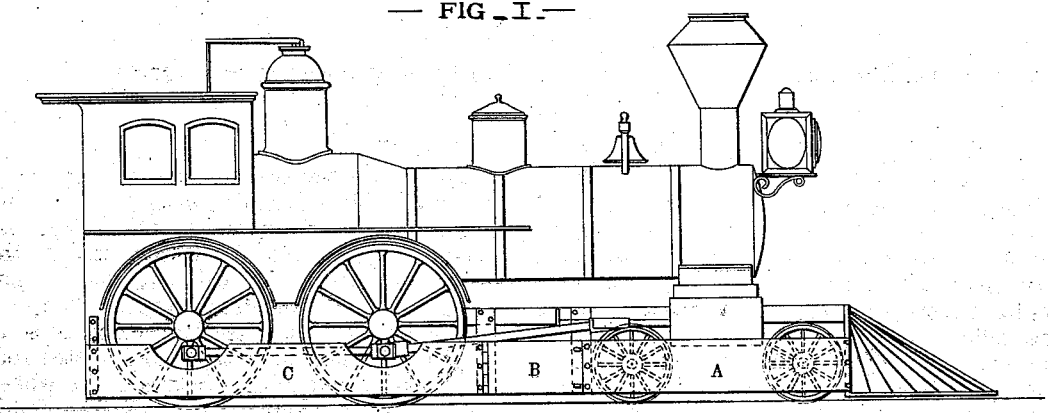
— FIG. II. —
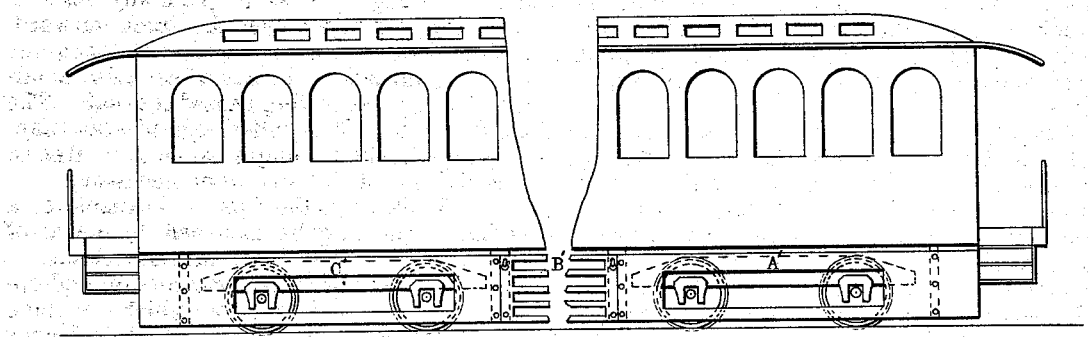
— FIG. III. —
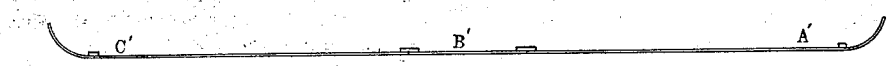
WITNESSES:　　　　　　　　　　　INVENTORS:

UNITED STATES PATENT OFFICE.

COLUMBUS E. FULK AND JOSHUA J. GOOD, OF CYNTHIANA, KENTUCKY; SAID FULK ASSIGNOR TO SAID GOOD.

IMPROVEMENT IN FENDERS FOR RAILWAY-CARRIAGE WHEELS.

Specification forming part of Letters Patent No. 154,327, dated August 25, 1874; application filed February 9, 1874.

*To all whom it may concern:*

Be it known that we, COLUMBUS E. FULK and JOSHUA J. GOOD, both of Cynthiana, in the county of Harrison and State of Kentucky, have invented certain Improvements in Fenders for Locomotive and Car Wheels, of which the following is a specification; and we do hereby declare that in the same is a full, clear, and exact description of our said invention, reference being had to the accompanying drawing and to the letters of reference marked thereon.

When a locomotive strikes an animal on the track near an embankment it throws the animal against the bank, and the animal rolls or struggles back under the locomotive or car wheels; also, an animal in attempting to run across the track or road when a train is approaching, will run into the wheels, causing, in either case, serious danger to the train and passengers.

The object of our invention is to prevent these and kindred occurrences; and it consists in a fender or covering for locomotive and car wheels, attached by any suitable means to the locomotive and cars in such a manner as to protect them from danger attendant upon the running down of stock, or to prevent stock or obstructions from getting under the wheels.

In the further description of our invention which follows, due reference must be had to the accompanying drawing, in which—

Figure 1 is a side view of a locomotive having our fender attached. Fig. 2 is a similar view of a car with the fender attached. Fig. 3 is a top view of the end of the fender attached to the car.

Similar letters of reference indicate similar parts of the invention in all the views.

Our fender may be made of sheet-iron, bar-iron, or any other suitable material.

A represents the first section bolted to the head-beam or cow-catcher, and extending back to the rear of the two small wheels of the locomotive. The second section, B, is a door hinged either to the first or third section, and fastened by any suitable lock or latch, so that it can be opened for the engineer to pass through to oil and clean the machinery. C represents the third section, which is so arranged as to clear the pitmen and piston-rods, and close all openings between the wheels. These three sections form a complete fender for one side of the locomotive. A', B', and C' represent the three sections for a fender for the wheels of a car or tender, which are constructed substantially in the manner described, except that the two end sections are curved or bent around in front of the wheels, as seen in Fig. 3, so as to push any obstructions from the inside over the track outward. These sections are provided with openings over the journals of the car-wheel axles to admit of oiling and cooling heated journals. The middle section, B', is bolted to braces, and supported by hooks or hinges, so as to be free to be raised out of the way when necessary.

The fender, whether for a locomotive, a tender, or car, may be attached by means of bolts, screws, or any other suitable means.

Having described the construction and operation of our invention, to which we have given the name of "Fulk and Good's fender for locomotive and car wheels," what we claim as new, and wish to secure by Letters Patent of the United States, is—

The fender for locomotive and car wheels, constructed in sections, one section constituting a door, all substantially as and for the purposes set forth.

COLUMBUS E. FULK.
JOSHUA J. GOOD.

Witnesses:
SAML. H. W. MIANES,
CHS. L. DONNALLY.